United States Patent
Dowd et al.

(10) Patent No.: US 10,710,750 B2
(45) Date of Patent: Jul. 14, 2020

(54) FLIGHT LINE AIR REFUELING HOSE TOOL KIT

(71) Applicant: Carleton Life Support Systems, Inc., Davenport, IA (US)

(72) Inventors: Don Dowd, Aledo, IL (US); Joe Beitelspacher, Davenport, IA (US); Brent Meeker, Davenport, IA (US); Lee Brandt, Davenport, IA (US); Max Gehl, Davenport, IA (US)

(73) Assignee: Cobham Mission Systems Davenport LSS Inc., Davenport, IA (US)

( * ) Notice: Subject to any disclaimer, the term of this patent is extended or adjusted under 35 U.S.C. 154(b) by 16 days.

(21) Appl. No.: 16/001,154

(22) Filed: Jun. 6, 2018

(65) Prior Publication Data

US 2018/0354652 A1    Dec. 13, 2018

Related U.S. Application Data

(60) Provisional application No. 62/516,436, filed on Jun. 7, 2017.

(51) Int. Cl.
   *B64F 5/40*    (2017.01)

(52) U.S. Cl.
   CPC .................................. *B64F 5/40* (2017.01)

(58) Field of Classification Search
   CPC .............. B64F 5/40; B64D 39/06; B23Q 1/70
   USPC ....... 206/223; 269/16, 163–138; 248/73, 76, 248/80, 150, 165–167, 434, 436, 346.3
   See application file for complete search history.

(56) References Cited

U.S. PATENT DOCUMENTS

| | | | |
|---|---|---|---|
| 5,490,432 A * | 2/1996 | Allard | F16C 43/02 73/825 |
| 5,564,176 A | 10/1996 | Garcia et al. | |
| 6,840,451 B2 * | 1/2005 | Allen | G06Q 10/06 235/462.09 |
| 6,994,294 B2 | 2/2006 | Saggio, III et al. | |
| 7,055,847 B2 | 6/2006 | Miller et al. | |
| 7,275,293 B2 | 10/2007 | Wathey | |
| 7,364,041 B2 | 4/2008 | Roesler | |
| 7,992,852 B2 | 8/2011 | Marineau et al. | |
| 8,127,799 B2 | 3/2012 | Cortez | |

(Continued)

FOREIGN PATENT DOCUMENTS

| | | |
|---|---|---|
| CN | 205600683 | 9/2016 |
| GB | 2418186 | 3/2006 |

OTHER PUBLICATIONS

Cobham: Retrieved from: http://www.cobham.com/mission-systems/ air-to-air-refuelling/air-to-air refuelling-customer-services/products-development/workshop-tool-kits/.

*Primary Examiner* — King M Chu
*Assistant Examiner* — L Kmet
(74) *Attorney, Agent, or Firm* — Woods Oviatt Gilman LLP; Katherine H. McGuire, Esq.

(57) ABSTRACT

A refueling hose tool kit for repairing or replacing air refueling hose end fittings may include a collapsible work stand configured to secure the hose end fitting when in a deployed extended orientation; a removal adapter ring; a hydraulically powered assembly clamp fixture; a hydraulically powered insert removal tool fixture; a wrench; a hydraulic pump; and a ruggedized case configured to receive the work stand, removal adapter ring, clamp fixture, insert removal tool fixture, wrench and hydraulic pump for storage and transport.

8 Claims, 2 Drawing Sheets

(56) References Cited

U.S. PATENT DOCUMENTS

2005/0029139 A1 2/2005 Chen
2018/0290288 A1* 10/2018 Brunner .................. B25H 1/04

* cited by examiner

FLIGHT LINE AIR REFUELING HOSE TOOL KIT

BACKGROUND OF THE INVENTION

Previous tooling for the task of removing, replacing, or repairing air refueling hose end fitting assemblies consist of various individual tooling components, either as loose items or as part of an inadequate kit. Previous kits also failed to provide an adequate work location to perform the necessary tasks associated with the removal, replacement or repair of the air refueling hose end fitting assemblies. Moreover, previous tooling kits required a minimum of two personnel to perform the tasks, and up to four personnel in some cases.

Thus, there is a need for tooling and an associated kit which provides the necessary work space and includes every tool and accessory necessary to perform the tasks at any location without the need for any additional accessory power. Additionally, there is a need for tooling and an associated kit which permits the tasks to be performed by one person, thereby reducing personnel requirements for hose reel maintenance. The present invention addresses these, as well as other, needs.

SUMMARY OF THE INVENTION

In view of the above and in accordance with an aspect of the present invention, the present invention is generally directed to a refueling hose tool kit for repairing or replacing air refueling hose end fittings. The kit may include a collapsible work stand configured to secure the hose end fitting when in a deployed extended orientation; a removal adapter ring; a hydraulically powered assembly clamp fixture; a hydraulically powered insert removal tool fixture; a wrench; a hydraulic pump; and a ruggedized case configured to receive the work stand, removal adapter ring, clamp fixture, insert removal tool fixture, wrench and hydraulic pump for storage and transport.

Figure 1:
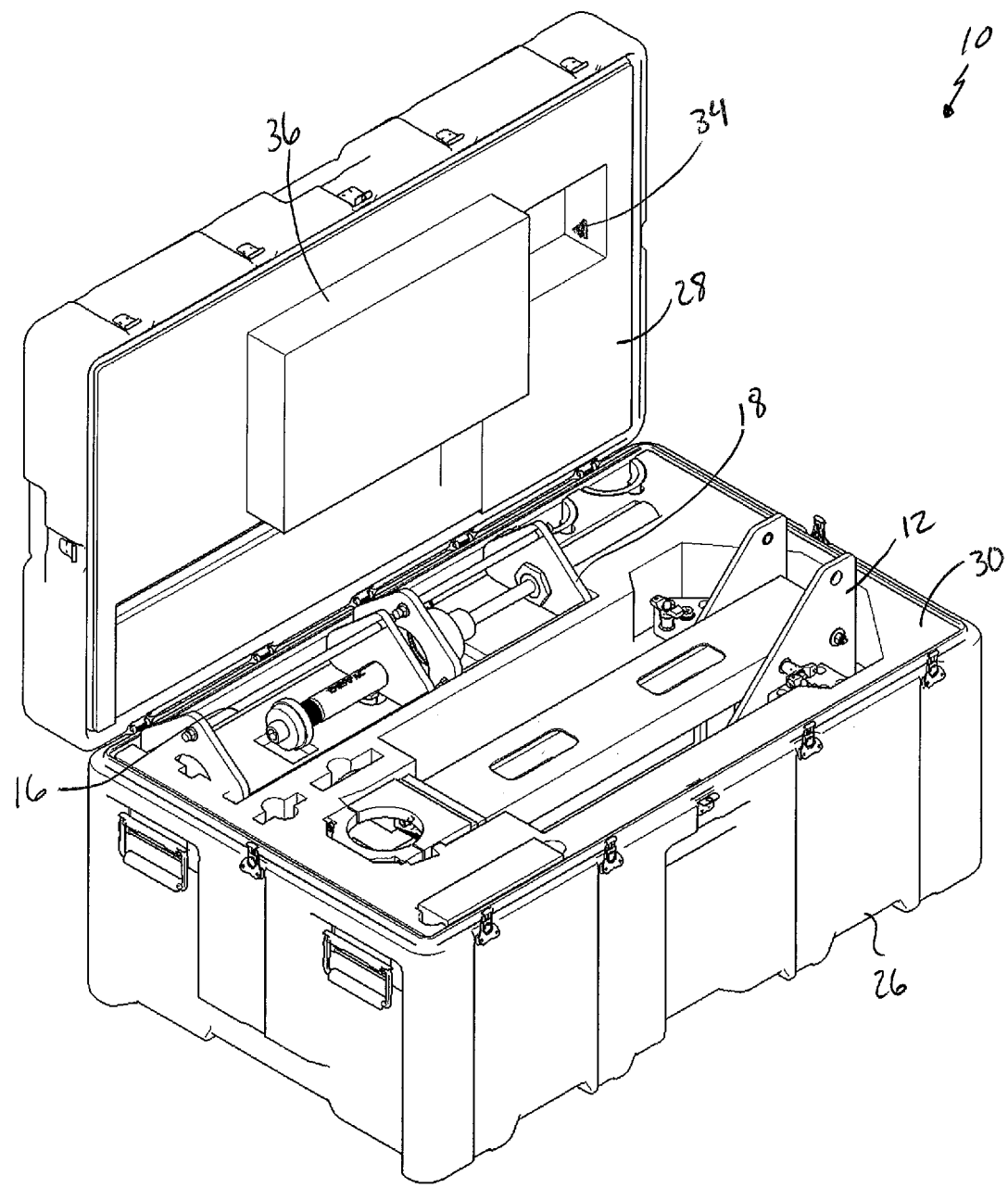
FIG. 1 is a perspective view of a tool kit in accordance with an aspect of the present invention.
Figure 2:
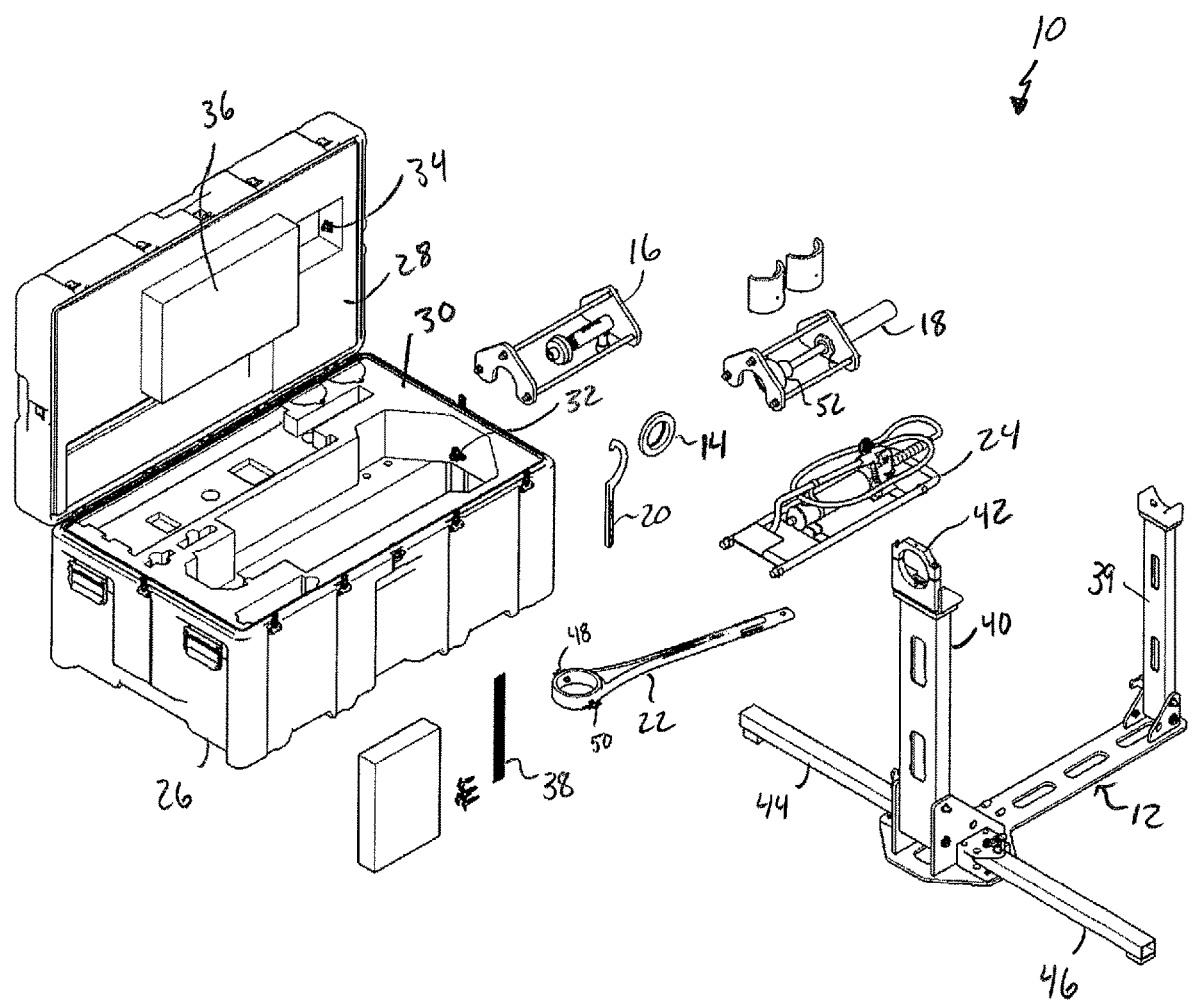
FIG. 2 is an exploded view of the tool kit shown in FIG. 1.

DESCRIPTION OF INVENTION le;2qWith reference to FIGS. 1 and 2, a flight line air refueling hose tool kit 10 may be a complete assembly consisting of tools necessary to allow air refueling hose end fittings to be removed, installed or repaired at any location that an aircraft carrying the air refueling system may be present. In one aspect of the invention, tool kit 10 may include a collapsible work stand 12 that may be configured to secure the hose end fitting parts necessary during the repair/replacement tasks as will be described in greater detail below. A removal adapter ring 14 and hydraulic fixtures 16, 18 may be configured for the installation (assembly clamp fixture 16) or removal (insert removal tool fixture 18) of the end fittings as will be described in greater detail below. Tool kit 10 may further include special wrenches and tools necessary to perform the task, such as but not limited to spanner 20 and wrench 22. A hydraulic pump, such as but not limited to foot operated pump 24, may also be included whereby hydraulic fixtures 16, 18 may be operated by foot pump 24 and thereby enable one person to perform the work necessary with full control over the process. Kit components, such as components 12 through 24 described above, may be housed within a ruggedized case 26. Case 26 may include molded foam inserts 28, 30 defining recesses and projections, such as but not limited to exemplary recesses 32, 34 and exemplary projection 36. The recesses and projections may be configured to selectively secure kit components (e.g., components 12 through 24) within case 26 when not in use and thereby eliminate or minimize unwanted and potentially damaging contact between respective components while also maintaining an organized workspace. Case 26 may also include rugged terrain wheels (not shown) and flight line safety markings (such as via reflective tape 38), and may also be able to fit within the prescribed size limitations for full expeditionary operations by the US Military.

In accordance with an aspect of the present invention, provision of tool kit 10 may enable an end user to take tool kit 10 anywhere in the world and have what is necessary to support hose and drogue operations. Moreover, work stand 12 and foot pump 24 may permit one person to operate hydraulic fixtures 16, 18 during repair/replacement tasks. To that end, work stand 12 may include extendable collapsible vertical posts 39, 40. Vertical post 40 may include a clamp fixture 42 configured to receive a fitting collar on the refueling hose. In this manner work stand 12 may receive and releasably secure the refueling hose and/or refueling hose end fittings when extended (FIG. 2) while also being stowable in a collapsed orientation when housed within case 26 (FIG. 1). Work stand 12 may further include horizontally extendable collapsible legs 44, 46 (shown collapsed in FIG. 1 and extended in FIG. 2). When extended, legs 44, 46 may permit an end user to place a foot on one or both legs so as to secure the stand and mounted refueling hose/hose end fitting. In this manner, a single end user may then apply the required torque to the hose end fittings to remove or replace the end fittings in contract to the three or four person requirement in the prior art.

The following description discusses an exemplary use of tool kit 10 and is by no means meant to limit the present invention solely thereto. Thus, in a first aspect of the exemplary use of tool kit 10, removal or installation of the hose end fittings at the inlet end of the refueling hose will require that that the refueling hose be deployed/extended for its entire length. Residual fuel may then be drained from the drogue system such that the refueling hose may be disconnected from the drum. On the other hand, removal or installation of the hose end fittings at the trailing end of the hose (the end of the refueling hose mounting the drogue and configured to extend outwardly from the aircraft when the refueling hose is deployed) requires the refueling hose to be manually deployed/extended for a distance sufficient to properly and safely utilize the equipment, such as at ground level. Repair or replacement of the trailing end hose fittings may also require removal of the refueling coupling, coupling adapter, and the ejection spring.

After removal of the refueling coupling, coupling adapter, and the ejection spring, both the trailing end and drogue system inlet ends of the hose are at that point identical and are disassembled in the same manner. The fitting collar on the refueling hose may be locked into the arbor of clamp fixture 42 of work stand 12. Wrench 22 may then slide over the fitting nut such that dowel pins 48, 50 are engaged with the fitting collar. Removal adapter ring 14 may then be attached to the attachment point of the fitting insert using the same lock wire that is used to secure the hose fitting on the drogue system. As the torque of the fitting nut is broken and the nut rotated counterclockwise (CCW), the adapter ring will pull the fitting insert from the compressed condition in the fitting collar. The fitting collets are then freed and the fitting insert and fitting collar are separated. Removal adapter ring 14 may then be removed from the fitting insert, wrench 22 may be removed. The refueling hose and the fitting insert may then be mounted on hydraulic insert removal fixture 18. Adapter 52 on hydraulic removal fixture 18 may then be secured to the fitting with the lock wire described above. Hydraulic pressure may be applied by foot pump 24 which may slowly remove the fitting insert from the inside of the hose end. The fitting collar can then be slid off the end of the hose.

In a second aspect of the exemplary use of tool kit 10, the trailing or inlet ends of the refueling hose are both installed using the same procedures. Initially, if a used hose is to be reused, sufficient length of the old crimped end of the hose will need to be cut off; new hoses will need any flare that may be present from the manufacturing process to be removed as well. The cut must be square to ensure the surface of the hose end makes contact with the fitting insert so the wire mesh makes electrical contact for static prevention/reduction of the hose while in flight as designed. The fitting collar is slid over the end of the hose, pushed out of the way, and the fitting insert is sufficiently lubricated with petrolatum and inserted into the hose end. The fitting collar is clamped into the arbor of clamp fixture 48, and the fitting collets, and the hose end with the insert inserted are prepositioned into the collar as the operator adheres to proper alignment. Hydraulically operated assembly clamp 16 may then be used to press the insert, collets and hose into the collar to the sufficient level. The fitting nut is then threaded onto the fitting collar, and tightened to using wrench 22.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting.

What is claimed is:

1. A refueling hose tool kit for repairing or replacing air refueling hose end fittings on a refueling hose, the tool kit comprising:
    a. a collapsible work stand including a stand base having first and second ends, a first collapsible vertical post pivotally coupled to the first end, a second collapsible vertical post pivotally coupled to the second end and including a clamp fixture configured to secure the hose end fitting when in a deployed extended orientation, and first and second horizontally extendable collapsible legs pivotally coupled to the second end;
    b. a removal adapter ring;
    c. a hydraulically powered assembly clamp fixture;
    d. a hydraulically powered insert removal tool fixture;
    e. a wrench; and
    f. a hydraulic pump configured to selectively pressurize the hydraulically powered assembly clamp fixture and the hydraulically powered insert removal tool fixture.

2. The refueling hose tool kit in accordance with claim 1 wherein the hydraulically powered insert removal tool fixture includes an adapter configured to be secured to the hose end fitting whereby pressurization of the hydraulically powered insert removal tool fixture via the hydraulic foot pump is configured to remove a hose end fitting insert from the hose end fitting.

3. The refueling hose tool kit in accordance with claim 1 wherein the wrench includes a pair of pins configured to engage a fitting nut on the hose end fitting whereby the wrench may selectively be rotated to tighten or loosen the fitting nut to allow removal of a fitting collar from the refueling hose.

4. The refueling hose tool kit in accordance with claim 1 wherein the hydraulic pump is a foot pump.

5. The refueling hose tool kit in accordance with claim 1 further including a case configured to receive the work stand, removal adapter ring, clamp fixture, insert removal tool fixture, wrench and hydraulic pump.

6. The refueling hose tool kit in accordance with claim 5 wherein the case is a ruggedized case.

7. The refueling hose tool kit in accordance with claim 6 wherein the case includes rugged terrain wheels.

8. The refueling hose tool kit in accordance with claim 5 wherein the case further includes molded foam inserts defining recesses and projections configured to selectively secure the work stand, removal adapter ring, clamp fixture, insert removal tool fixture, wrench and hydraulic pump within the case when not in use.

* * * * *